United States Patent [19]
Kawabata

[11] Patent Number: 6,097,952
[45] Date of Patent: Aug. 1, 2000

[54] MOBILE COMMUNICATION TERMINATION CONTROLLING METHOD AND MOBILE COMMUNICATION TERMINATION CONTROLLING SYSTEM

[75] Inventor: Hisashi Kawabata, Tokyo, Japan

[73] Assignee: NEC Corporation, Tokyo, Japan

[21] Appl. No.: 09/192,309

[22] Filed: Nov. 16, 1998

[30] Foreign Application Priority Data

Nov. 18, 1997 [JP] Japan ..................................... 9-335125

[51] Int. Cl.⁷ .............................. H04Q 7/24; H04Q 7/20
[52] U.S. Cl. ......................... 455/435; 455/528; 455/67.1; 455/445; 455/517; 455/427; 455/403; 455/428
[58] Field of Search .................................. 455/435, 528, 455/67.1, 445, 517, 427, 403, 428, 432, 458

[56] References Cited

U.S. PATENT DOCUMENTS

| | | | |
|---|---|---|---|
| 5,107,494 | 4/1992 | Johnson et al. | 455/528 |
| 5,602,900 | 2/1997 | Hattori | 379/58 |
| 5,610,969 | 3/1997 | McHenry et al. | 455/435 |
| 5,621,784 | 4/1997 | Tiedmann, Jr. et al. | 455/435 |
| 5,842,128 | 11/1998 | Kito et al. | 455/435 |
| 5,974,092 | 10/1999 | Roos et al. | 455/13.1 |
| 5,978,667 | 11/1999 | Suzuki et al. | 455/403 |

FOREIGN PATENT DOCUMENTS

| | | |
|---|---|---|
| 6-260990 | 9/1994 | Japan . |
| 2-5636 | 1/1996 | Japan . |
| 8-79387 | 3/1996 | Japan . |
| 8-256210 | 10/1996 | Japan . |
| 9-55980 | 2/1997 | Japan . |

*Primary Examiner*—Fan Tsang
*Assistant Examiner*—Simon Nguyen
*Attorney, Agent, or Firm*—Whitham, Curtis & Whitham

[57] ABSTRACT

A mobile communication termination controlling method for controlling each of a plurality of mobile stations to which a call is transmitted from a public telephone network connected to a base station, the mobile stations being connected to the base station with a radio circuit is disclosed, that comprises the steps of (a) registering a termination difficulty state to each of the mobile stations when it is predicted that the mobile station will not stably transmit and receive a radio wave, (b) causing a mobile station that has been registered in the termination difficulty state at step (a) and that has a call transmitted from the public telephone network to enter a termination difficulty mode, (c) determining whether or not termination control information has been unsuccessfully exchanged between the mobile station in the termination difficulty mode and the base station, (d) repeating a termination control of the unsuccessfully exchanged termination control information that has been determined at step (c) a predetermined number of times, (e) informing the user of the mobile station of the state of the termination control performed at step (d), and (f) issuing a command to the user of the mobile station so as to stably perform the termination control corresponding to the state of the termination control performed at step (d).

16 Claims, 6 Drawing Sheets

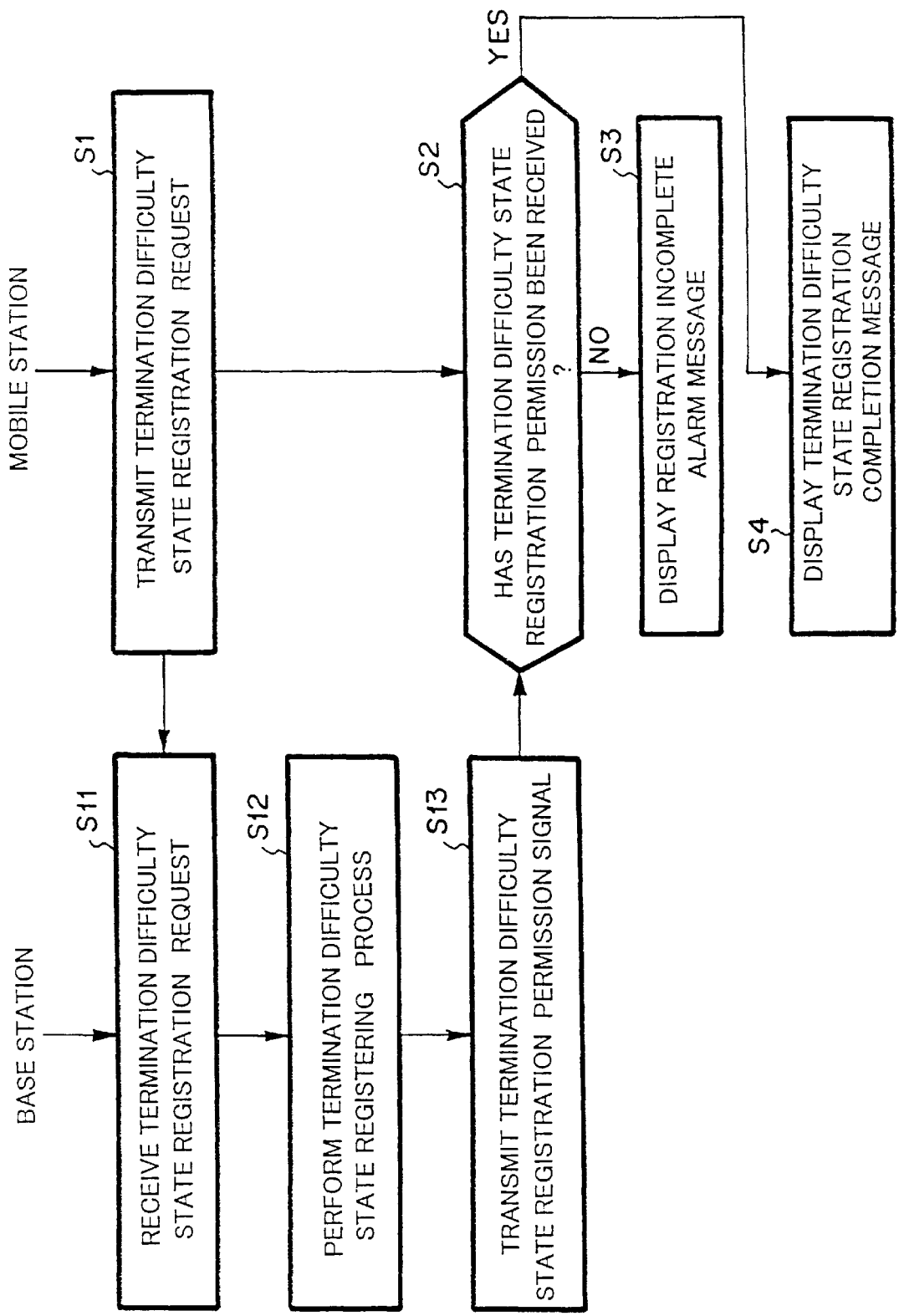

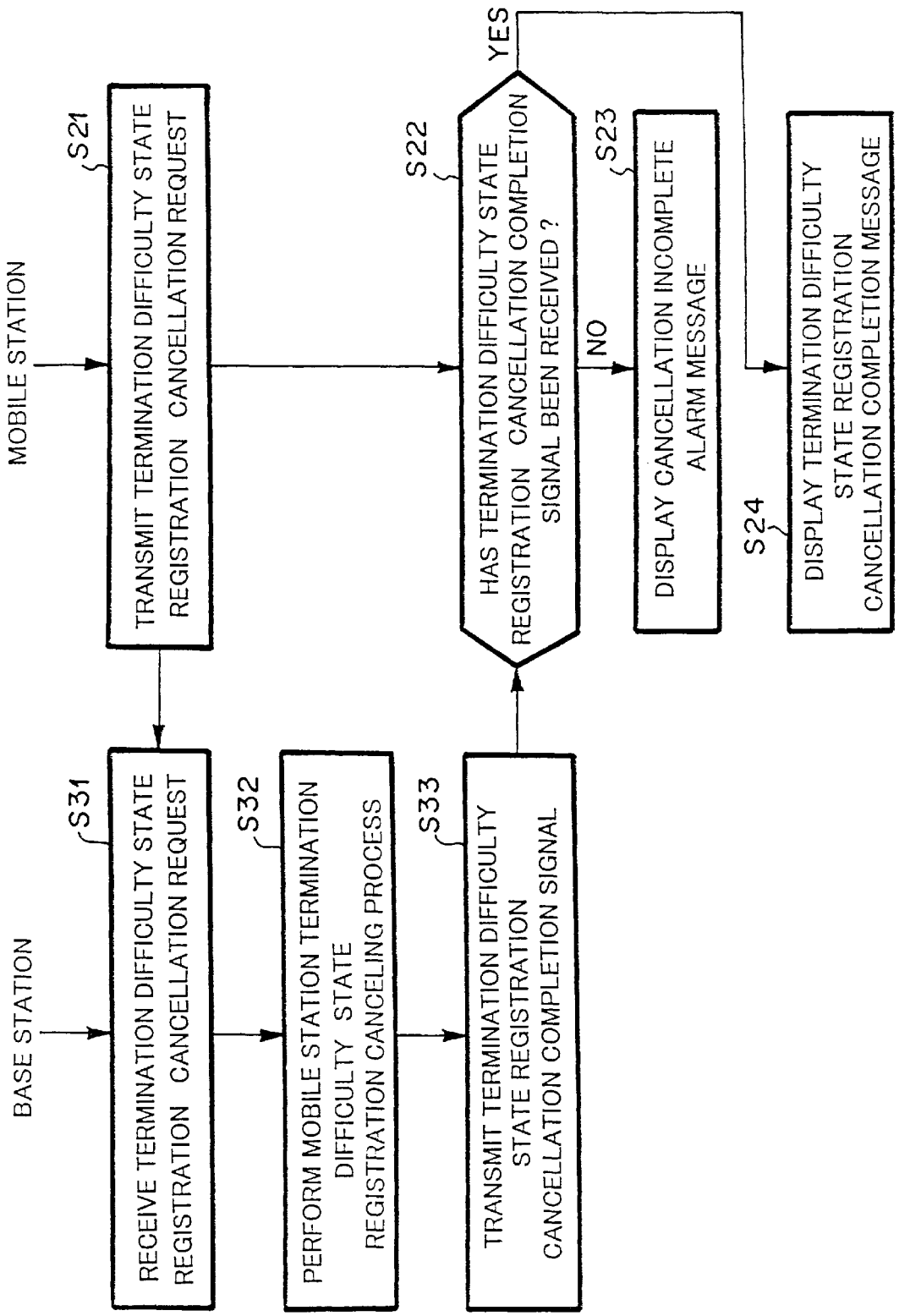

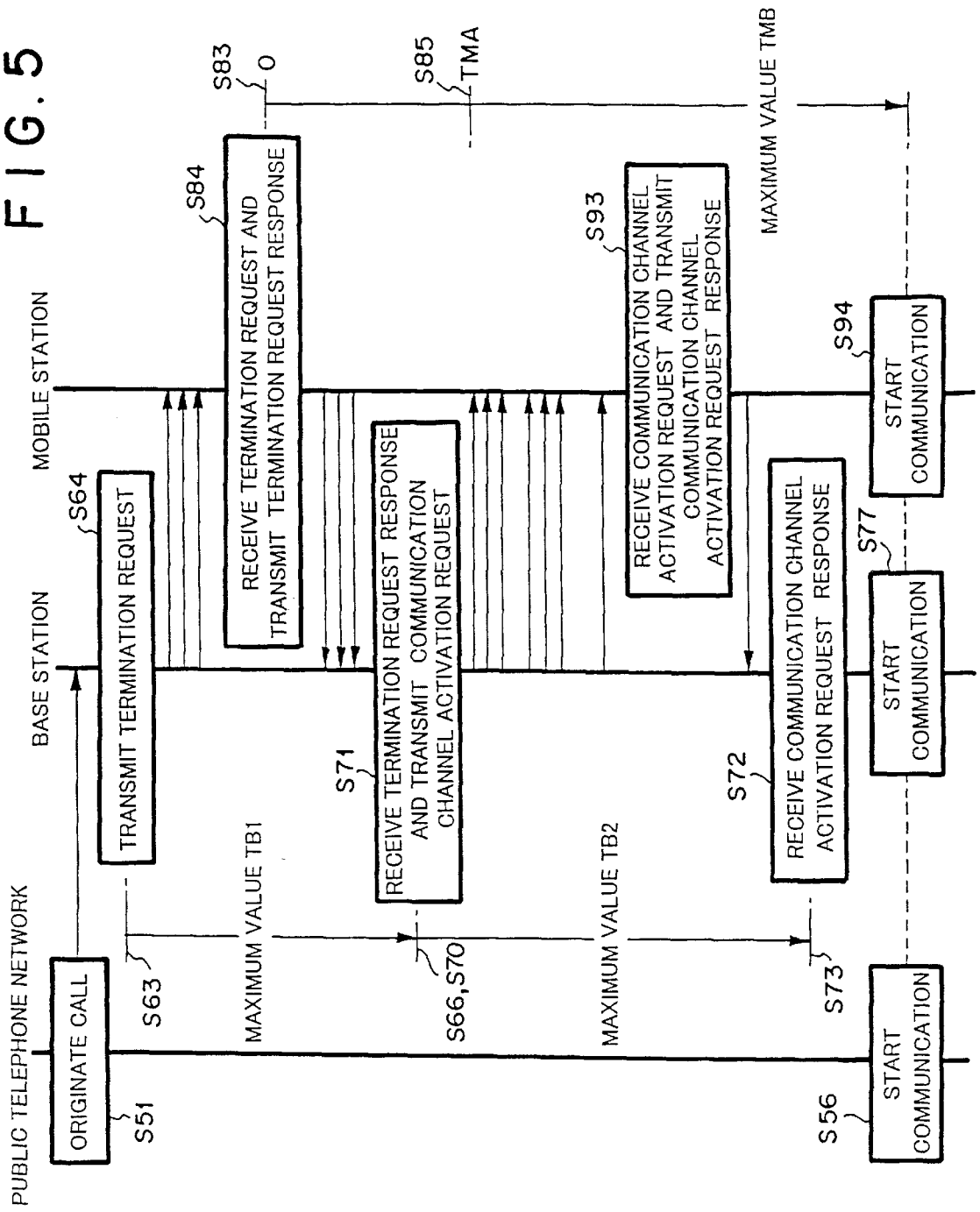

MOBILE COMMUNICATION TERMINATION CONTROLLING METHOD AND MOBILE COMMUNICATION TERMINATION CONTROLLING SYSTEM

BACKGROUND OF THE INVENTION

1. Field of the Invention

The present invention relates to a mobile communication termination controlling method and a mobile communication termination controlling system that allow the user of a mobile station to pre-register a termination mode in the case that he or she predicts that the mobile station will be blocked or shadowed and thereby will not stably transmit and receive a radio wave so that opportunities for receiving calls increase in the mobile station.

2. Description of the Related Art

In a conventional mobile communication, when a mobile station is present in a building or is shielded, since a termination controlling sequence is not completed, a call may not be terminated to the mobile station.

In a mobile communication using a low-orbit communication satellite, which will be widely used in near future, since the communication satellite travels in low orbits of the Earth, the receiving condition of a mobile station will vary time by time.

When the receiving condition of a mobile station is bad in a satellite communication using a low-orbit satellite, signals are not stably transmitted and received between the communication satellite and the mobile station in the period necessary for the termination controlling sequence performed therebetween. Thus, it is predicted that the termination controlling sequence is not perfectly performed.

As a technology for increasing the probability of which a radio circuit is established between a mobile station and a base station in such a situation, a termination controlling system for a mobile communication system has been proposed as Japanese Patent Laid-Open Publication No. Hei-2-005636.

In the related art reference disclosed as Japanese Patent Laid-Open Publication No. Hei-2-005636, unless a termination controlling sequence has been completed, the mobile station does not indicate a termination call. Thus, in a situation that the termination controlling sequence has not been partially performed, the mobile station cannot inform the user that a termination call to the mobile station has taken place. Thus, opportunities for receiving calls remarkably decrease in the mobile station.

Even if only a termination call is indicated in the middle of the termination controlling sequence, unless the mobile station can stably transmit and receive signals, the mobile station cannot enter a communication state. Thus, with the technology of the related art reference, the usefulness is not improved.

SUMMARY OF THE INVENTION

An object of the present invention is to provide a mobile communication termination controlling method and a mobile communication termination controlling system that allow opportunities for receiving calls to increase and probability that a mobile station enters a communication state to increase even if the receiving condition of the mobile station is bad.

A first aspect of the present invention is a mobile communication termination controlling method for controlling each of a plurality of mobile stations to which a call is transmitted from a public telephone network connected to a base station, the mobile stations being connected to the base station with a radio circuit, the method comprising the steps of (a) registering a termination difficulty state to each of the mobile stations when it is predicted that the mobile station will not stably transmit and receive a radio wave, (b) causing a mobile station that has been registered in the termination difficulty state at step (a) and that has a call transmitted from the public telephone network to enter a termination difficulty mode, (c) determining whether or not termination control information has been unsuccessfully exchanged between the mobile station in the termination difficulty mode and the base station, (d) repeating a termination control of the unsuccessfully exchanged termination control information that has been determined at step (c) a predetermined number of times, (e) informing the user of the mobile station of the state of the termination control performed at step (d), and (f) issuing a command to the user of the mobile station so as to stably perform the termination control corresponding to the state of the termination control performed at step (d).

Thus, even if the receiving condition of the mobile station is not good, opportunities for receiving calls increase in the mobile station.

A second aspect of the present invention is a mobile communication termination controlling system for controlling each of a plurality of mobile stations to which a call is transmitted from a public telephone network connected to a base station, the mobile stations being connected to the base station with a radio circuit, the system comprising a termination difficulty state registering means for registering a termination difficulty state to each of the mobile stations when it is predicted that the mobile station will not stably transmit and receive a radio wave, a termination difficulty mode entering means for causing a mobile station that has been registered in the termination difficulty state by the termination difficulty state registering means and that has a call transmitted from the public telephone network to enter a termination difficulty mode, a termination control transmission/reception state determining means for determining whether or not termination control information has been unsuccessfully exchanged between the mobile station in the termination difficulty mode and the base station, a termination control re-executing means for repeating a termination control of the unsuccessfully exchanged termination control information that has been determined by the termination control transmission/reception state determining means a predetermined number of times, a termination control state informing means for informing the user of the mobile station of the state of the termination control performed by the termination control re-executing means, and a termination control state improvement commanding means for issuing a command to the user of the mobile station so as to stably perform the termination control corresponding to the state of the termination control performed by the termination control re-executing means.

Thus, even if the receiving condition of the mobile station is not good, opportunities for receiving calls increase in the mobile station.

A further aspect of the present invention is a mobile communication termination controlling system wherein said termination difficulty state registering means comprises mobile station termination difficulty state updating means for causing the base station to update the termination difficulty state of each mobile station corresponding to a termination difficulty state registration request that is transmitted from the mobile station to the base station in the case that it is predicted that the mobile station will not stably transmit and receive a radio wave, and termination difficulty state registration permission storing means for storing termination difficulty state registration permission completion information that represents that the termination difficulty state has been registered for each mobile station corresponding to termination difficulty registration state permission information that has been updated by said mobile station termination difficulty state updating means and that has been transmitted to the mobile station, and wherein said termination control transmission/reception state determining means determines whether or not termination control information has been unsuccessfully exchanged between the mobile station in the termination difficulty mode and the base station corresponding to a call to the mobile station that has been registered in the termination difficulty state updated by said mobile station termination difficulty state updating means and the termination difficulty state registration permission completion information stored by said termination difficulty state registration permission storing means.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a flow chart showing the operations of a mobile station and a base station corresponding to a termination difficulty state registration request in the mobile communication termination controlling system based on the mobile communication termination controlling method according to the embodiment of the present invention;

FIG. 3 is a flow chart showing the operations of a mobile station and a base station corresponding to a termination difficulty state registration cancellation request in the mobile communication termination controlling system based on the mobile communication termination controlling method according to the embodiment of the present invention;

FIG. 5 is a sequence chart showing the connection controlling procedure performed among the public telephone network, the base station, and the mobile station in the mobile communication termination controlling system based on the mobile communication termination controlling method according to the embodiment of the present invention.

DESCRIPTION OF PREFERRED EMBODIMENTS

Next, a mobile communication termination controlling method and a mobile communication termination controlling system according to an embodiment of the present invention will be described.

Figure 1:
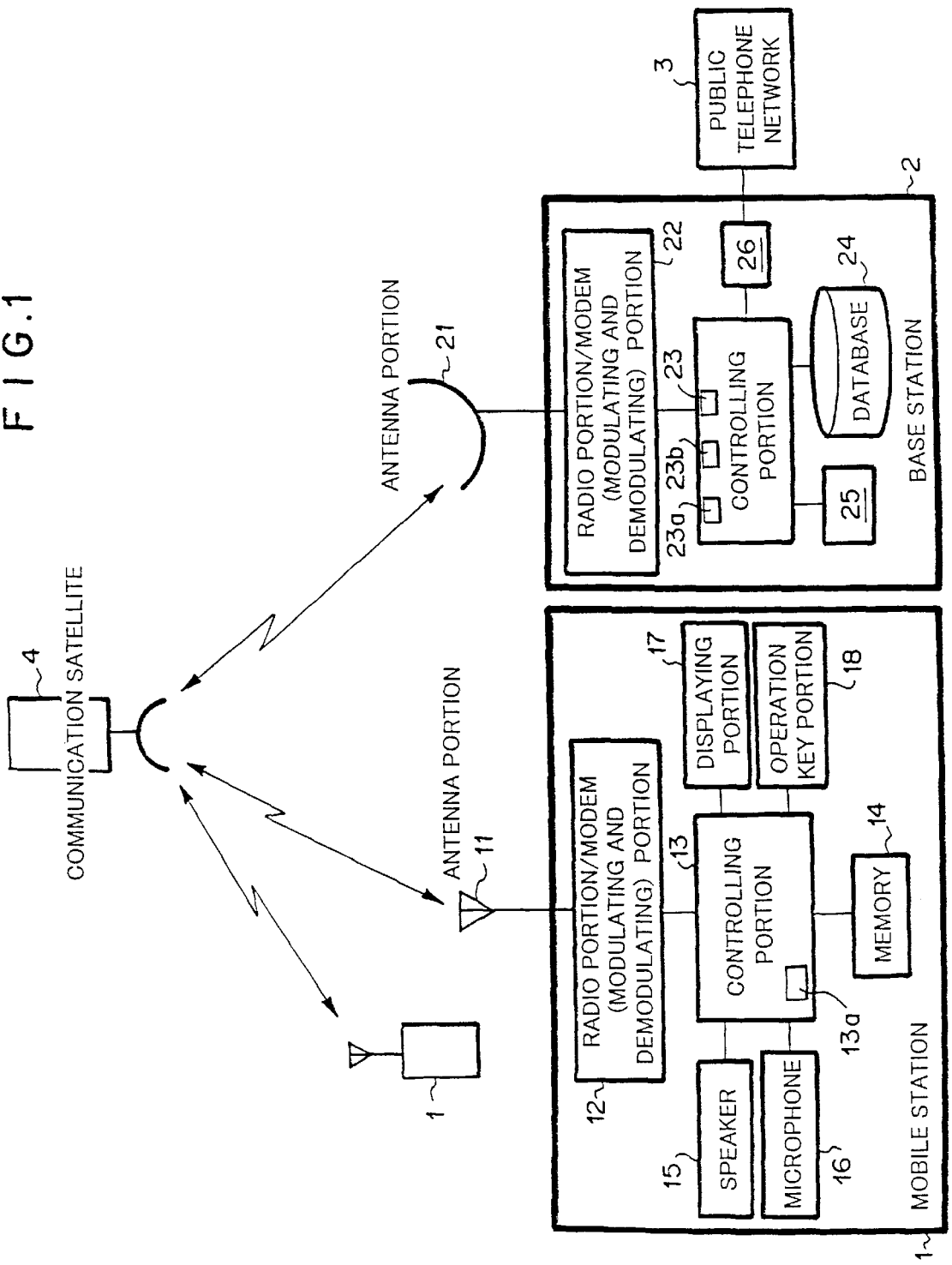
FIG. 1 is a block diagram showing the structure of a mobile communication termination controlling system based on a mobile communication termination controlling method according to an embodiment of the present invention.

FIG. 1 is a block diagram showing the structure of a mobile communication termination controlling system based on a mobile communication termination controlling method according to an embodiment of the present invention.

The mobile communication termination controlling system according to the present invention comprises a plurality of mobile stations 1, a public telephone network 3, a base station 2, and a communication satellite 4. The base station 2 is connected to the public telephone network 3. The communication satellite 4 establishes a communication circuit that connects the mobile stations 1 and the base station 2 with a radio communication signal.

Each of the mobile stations 1 comprises an antenna portion 11, a radio portion/modem (modulating and demodulating) portion 12, a controlling portion 13, a memory 14, a speaker 15, a microphone 16, a displaying portion 17, and an operation key portion 18.

The antenna portion 11 transmits and receives a radio frequency signal to/from the communication satellite 4.

The radio portion/modem (modulating and demodulating) portion 12 modulates a signal transmitted from the self-local mobile station 1 to the communication satellite 4 and demodulates a radio frequency signal received from the communication satellite 4 to the mobile station 1.

In addition to controlling each portion of the mobile station 1, the controlling portion 13 has a termination difficulty mode operation function 13a that causes the mobile station 1 to operate in a termination difficulty mode corresponding to a relevant command that the user enters with the operation key portion 18.

The memory 14 stores for example data that represents the termination difficulty mode of the mobile station 1.

The speaker 15 allows the user of the mobile station 1 to vocally know that the mobile station 1 has received a call and that the mobile station 1 is in the termination difficulty state.

The microphone 16 allows the user of the mobile station 1 to talk to communicate with a remote party.

The displaying portion 17 allows the user of the mobile station 1 to visually know that the mobile station 1 has received a call and that the mobile station 1 is in the termination difficulty state.

The operation key portion 18 allows the user of the mobile station 1 to set for example the termination difficulty mode.

The base station 2 comprises an antenna portion 21, a radio portion/modem (modulating and demodulating) portion 22, a controlling portion 23, a database 24, a talkie unit 25, and a switching unit 26.

The antenna portion 21 transmits and receives a radio frequency signal to/from the communication satellite 4.

The radio portion/modem (modulating and demodulating) portion 22 modulates a signal transmitted from the base station 2 to the communication satellite 4 and demodulates a radio frequency signal received from the communication satellite 4.

The controlling portion 23 controls each portion of the base station 2. In addition, the controlling portion 23 has a mobile station termination mode registration update function 23a, a termination difficulty mode operation function 23b, and a talkie guide message transmission function 23c. In the mobile station termination mode registration update function 23a, the controlling portion 23 updates the registration of the mobile station termination mode in the database 24 corresponding to the termination difficulty state registration request received from the mobile station 1. In the termination difficulty mode operation function 23b, when a call is originated from the public telephone network 3 to the mobile station 1, the controlling portion 23 searches the termination mode of the mobile station 1 from the database 24 and causes the base station 2 to operate in the termination difficulty mode. In the talkie guide message transmission function 23c, the controlling portion 23 causes the talkie unit 25 to transmit a talkie guide message to the calling user of the public telephone network 3.

The database 24 stores registration information (such as mobile station termination difficulty mode registration) of termination modes of all the mobile stations 1.

The talkie unit 25 transmits a talkie guide message to the public telephone network 3.

The switching unit 26 performs a call connecting process with the public telephone network 3.

FIG. 2 is a flow chart showing the operations of the mobile station 1 and the base station 2 corresponding to a termination difficulty state registration request exchanged between the mobile station 1 and the base station 2 in the case that the user of the mobile station can predict that the mobile station 1 will not stably receive a radio wave from the communication satellite 4.

FIG. 3 is a flow chart showing the operations of the mobile station 1 and the base station 2 corresponding to a termination difficulty state registration cancellation request issued by the user of the mobile station in the case that he or she can predict that the mobile station 1 will restore a stable radio wave receiving state in which the mobile station 1 can stably receive a radio wave from the communication satellite 4.

Figure 4A:
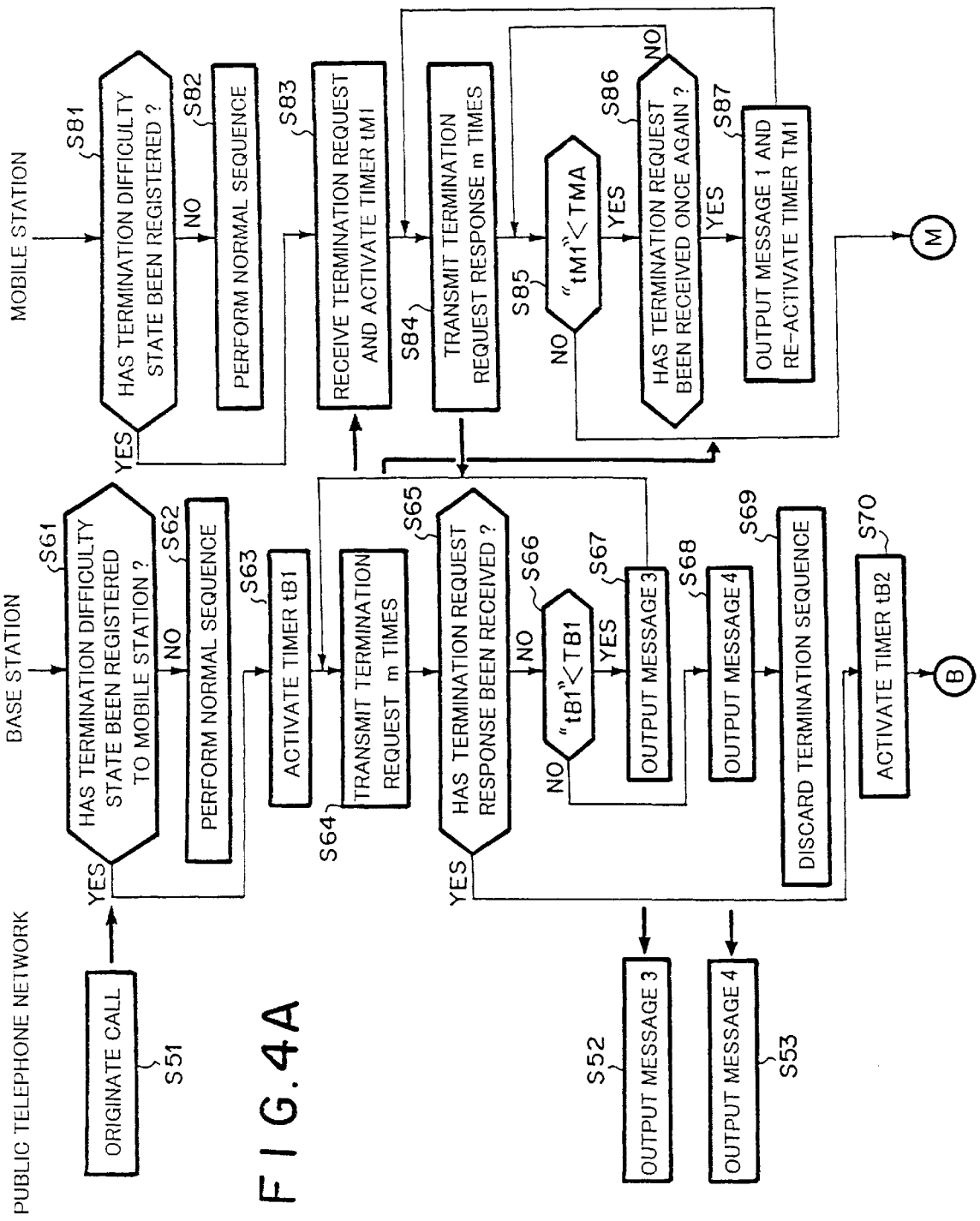
FIG. 4 is a flow chart showing a connection controlling procedure performed among a public telephone network, a base station, and a mobile station in the mobile communication termination controlling system based on the mobile communication termination controlling method according to the embodiment of the present invention.
Figure 4B:
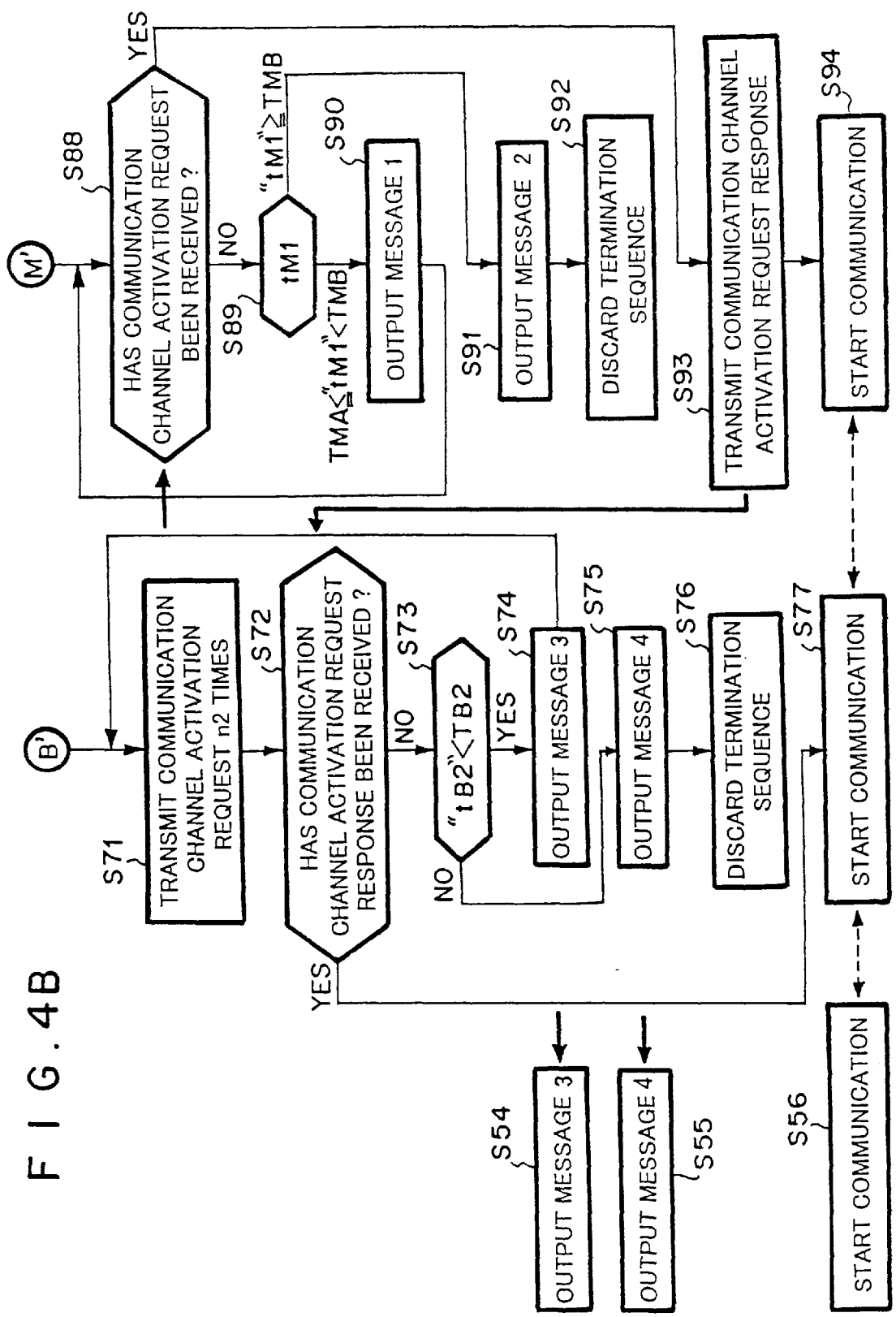

FIGS. 4A and 4B are a flow chart showing a connection controlling procedure performed among the public telephone network 3, the base station 2, and the mobile station 1.

FIG. 5 is a signal sequence chart showing the connection controlling procedure performed among the public telephone network 3, the base station 2, and the mobile station 1.

Next, the mobile communication termination controlling method and the operation of the mobile communication termination controlling system according to the embodiment of the present invention will be described.

With reference to the flow chart shown in FIG. 2, the termination difficulty state registration request issued from the mobile station 1 to the base station 2 in the case that the user of the mobile station 2 predicts that the mobile station 1 will not stably receive a radio wave from the communication satellite 4. When the user of the mobile station 1 can predict that it will not stably receive a radio wave from the communication satellite 4, he or she operates the operation key portion 18 of the mobile station 1 so as to transmit the termination difficulty state registration request to the base station 2 through the communication satellite 4 (at step S1).

The base station 2 receives the termination difficulty state registration request from the mobile station 1 (at step S11). The base station 2 updates mobile station termination difficulty state registration information stored in the database 24 so as to perform the mobile station termination difficulty state registering process (at step S12). After updating the mobile station termination difficulty state registration information, the base station 2 transmits a termination difficulty state registration permission signal to the relevant mobile station 1 (at step S13).

The controlling portion 13 of the mobile station 1 determines whether or not the mobile station 1 has received the termination difficulty state registration permission signal from the base station 2 (at step S2). When the determined result at step S2 is Yes (namely, the termination difficulty state registration permission signal has been received from the base station 2), the controlling portion 13 records data that represents that the termination difficulty state registration has been completed to the memory 14 and causes the displaying portion 17 to display the data (at step S4). When the determined result at step S2 is No (namely, the termination difficulty state registration permission signal has not been received from the base station 2), the controlling portion 13 causes the displaying portion 17 to display a registration incomplete alarm (at step S3).

Next, with reference to the flow chart shown in FIG. 3, the termination difficulty state registration cancellation request that is issued from the mobile station 1 to the base station 2 in the case that the user of the mobile station 1 can predict that the mobile station 1 will restore a stable radio wave receiving state in which the mobile station 1 can stably receive a radio wave from the communication satellite 4 will be described.

When the user of the mobile station 1 can predict that the mobile station 1 will restore the stable radio wave receiving state in which the mobile station 1 can stably receive a radio wave from the communication satellite 4, he or she operates the operation key portion 18 of the mobile station so as to transmit the termination difficulty state registration cancellation request to the base station 2 through the communication satellite 4 (at step S21).

The base station 2 receives the termination difficulty state registration cancellation request (at step S31) and updates the mobile station termination difficulty state registration information stored in the database 24 so as to perform the mobile station termination difficulty state registration canceling process (at step S32). After updating the mobile station termination difficulty state registration information, the controlling portion 23 of the base station 2 transmits a termination difficulty state registration cancellation completion signal to the mobile station 1 (at step S33).

The controlling portion 13 of the mobile station 1 determines whether or not the mobile station 1 has received the termination difficulty state registration cancellation completion signal from the base station 2 (at step S22). When the determined result at step S22 is Yes (namely, the mobile station 1 has received the termination difficulty state registration cancellation completion signal from the base station 2), the controlling portion 13 records data that represents that the termination difficulty state registration has been canceled to the memory 14 and causes the displaying portion 17 to display the data (at step S24). When the determined result at step S22 is No (namely, the mobile station 1 has not received the termination difficulty state registration cancellation completion signal from the base station 2), the controlling portion 13 causes the displaying portion 17 to display a registration cancellation incomplete alarm message (at step S23).

Next, with reference to the flow chart shown in FIG. 4 and the sequence chart shown in FIG. 5, the connection controlling procedure performed among the public telephone network 3, the base station 2, and the mobile station 1 will be described.

When a user of the public telephone network 3 originates a call to a mobile station 1 (at step S51), the controlling portion 23 of the base station 2 searches the database 24 so as to determine whether or not the termination difficulty state has been registered to the mobile station 1 (at step S61). When the determined result at step S61 is No (namely, the termination difficulty state has not been registered), the controlling portion 23 performs a normal termination controlling process (at step S62)

On the other hand, when the determined result at step S61 is Yes (namely, the termination difficulty state has been registered), the controlling portion 23 sets a termination difficulty mode to the mobile station 1 so that opportunities for receiving calls increase in the mobile station 1. In addition, the controlling portion 23 activates a timer tB1 (hereinafter, the timer value of the timer tB1 is denoted by "tB1") and transmits a termination request to the mobile station 1 n1 times (where n1=1, 2, 3, . . . ) (at steps S63 and S64). When the number of times of the transmission of the termination request (n1) is large, opportunities for receiving calls increase in the mobile station 1. However, wasteful processes may increase. In addition, it takes a long time for receiving a call in the mobile station 1. Thus, the number of times (n1) should be decided considering such conditions. In FIG. 4, the number of times of the transmission of the termination request (n1) is set to "3".

In the case that the termination difficulty state has been registered in the memory 14, when the mobile station 1 receives the termination request from the base station 2, the controlling portion 13 of the mobile station 1 activates a timer tM1 (hereinafter, the timer value of the timer tM1 is denoted by "tM1") and transmits a termination request response m times (where m=1, 2, 3, . . . ) (at steps S83 and S84). When the number of times of the transmission of the termination request response (m) is large, the probability of receiving the termination request response signal increases in the communication satellite 4. However, wasteful processes may increase. In addition, it takes a long time for performing a termination control. Thus, the number of times of the transmission of the termination request response (m) should be decided in consideration of such conditions. In FIG. 4, the number of times of the transmission of the termination request response is set to "3".

After transmitting the termination request, when the base station 2 receives the termination request response from the mobile station 1 without a delay, the controlling portion 23 of the base station 2 activates a timer tB2 (hereinafter, the timer value of the timer tB2 is referred to as "tB2") and transmits a communication channel activation request n2 times (where n2=1, 2, 3, . . . ) (at steps S65, S70, and S72). In this example, "without a delay" means that the base station 2 receives the termination request response after a time period corresponding to the sum of a propagation delay and a process delay of the mobile station 1 elapses. When the number of times of the transmission of the communication channel activation request (n2) is large, the probability of receiving the communication channel activation request signal increases in the mobile station 1. However, wasteful processes may increase. In addition, it takes a long time for performing a termination control. Thus, the number of times of the transmission of the communication channel activation request should be decided in consideration of such conditions. In the example shown in FIG. 4, the number of times of the transmission of the communication channel activation request is set to "3".

The timer tB1 activated at step S63 stops after the termination request is transmitted until the termination request response is received as shown in FIG. 5. When the base station 2 has not received the termination request response from the mobile station 1 just after transmitting the termination request, the timer value "tB1" of the timer tB1 is smaller than the maximum value TB1. In this case, the controlling portion 23 of the base station 2 determines that the mobile station 1 has failed to receive the termination request or the communication satellite 4 has not received the termination request response signal transmitted by the mobile station 1 due to a blocking trouble and outputs a message 3 that represents that the base station 2 is attempting to connect a call to the mobile station and that asks the calling user to wait for a moment (at step S67). Thereafter, the base station 2 transmits the termination request once again (at step S64) and then waits for the termination request response (at step S65).

The message 3 that represents that the base station is attempting to connect a call to the mobile station 1 and that asks the calling user to wait for a moment is output to the public telephone network 3 (at steps S67 and S52).

When the determined result at step S66 is No (namely, the timer value "tB1" of the timer tB1 exceeds the maximum value TB1), the controlling portion 23 determines that the power of the mobile station 1 has been turned off or that the mobile station 1 is not in a proper area with a sufficient receiving level and outputs a message 4 to the public telephone network 3 (at steps S68 and S53). Thereafter, the controlling portion 23 discards the termination sequence (at step S69).

The message 4 transmitted at step S68 represents that the termination sequence for a call originated by a user of the public telephone network 3 is discarded.

A threshold value TMA at step S85 represents a period in which the controlling portion 23 of the base station 2 determines whether or not the termination request response has been received from the mobile station 1. In other words, when the mobile station 1 has received the termination request signal and the base station 2 has transmitted the termination request response, if the mobile station 1 receives the termination request, since the base station 2 does not receive the termination request response, the controlling portion 23 of the base station 2 determines that the termination request has been transmitted (at steps S65, S66, S67, and S64). In this case, the mobile station 1 transmits the termination request response to the base station 2 once again (at steps S84, S85, S86, and S87). In addition, the controlling portion 13 of the mobile station 1 informs the user that the mobile station 1 is performing the termination control, that the mobile station 1 is in an improper area for the communication with the communication satellite 4 through the displaying portion 17 and the speaker 15. In addition, the controlling portion 13 causes the displaying portion 17 to display a message for asking the user to move the mobile station 1 to a proper area for the communication with the communication satellite 1.

When the mobile station 1 has not re-received the termination request in the condition of "tM1">TMA (at steps S85 and S86), the controlling portion 13 determines that the base station 2 has received the termination request response and waits for the communication channel activation request (at step S88).

When the base station 2 has received the termination request response from the mobile station 1 at step S65, the controlling portion 23 of the base station 2 activates the timer tB2 (at step S70) and transmits the communication channel activation request n2 times (where n2=1, 2, 3, . . . ) (at step S71).

When the mobile station 1 has received the communication channel activation request at step S88, the mobile station 1 transmits the communication channel activation request response at step S93 and starts a communication (at step S94).

When the mobile station 1 has received the communication channel activation request at step S88, the mobile station 1 transmits the communication channel activation request response to the base station 2 at step S93 and starts the communication at step S94.

When the mobile station 1 has not received the communication channel activation request at step S88 and the controlling portion 13 of the mobile station 1 has determined that "tM1" does not exceed the maximum value TMB of the waiting time at step S89, the controlling portion 13 determines that the mobile station 1 has failed to receive the communication channel activation request, informs the user that the mobile station 1 is performing a termination control and that the mobile station 1 is not in a proper area for the communication with the communication satellite 4 through the displaying portion 17 and the speaker 15, and causes the displaying portion 17 to display the message 1 for asking the user to move the mobile station 1 to a proper area for the communication with the communication satellite 4 (at step S90). Thereafter, the controlling portion 13 returns to the state waiting for the communication channel activation request (at step S88).

When the mobile station 1 has not received the communication channel activation request at step S88 and the controlling portion 13 has determined that "tM1" exceeds the maximum value TMB of the waiting time at step S89, the mobile station 1 outputs the message 2 that represents it will discard the call connection (at step S91) and then discards the termination sequence (at step S92).

After transmitting the communication channel activation request, when the base station 1 has received the communication channel activation request without a delay (at step S72), the base station 2 causes a communication between a user of the public telephone network 3 and the mobile station 1 to start (at steps S56, S77, and S94).

The timer tB2 activated at step S70 stops after the communication channel activation request is transmitted until the communication channel activation request response is received as shown in FIG. 5. Thus, after transmitting the communication channel activation request (at step S71), when the base station 2 has not received the communication channel activation request response and the controlling portion 23 has determined that the timer value "tB2" of the timer tB2 does not exceed the maximum value TB2 (at steps S72 and S73), the controlling portion 23 determines that the mobile station 1 has failed to receive the communication channel activation request or that the communication satellite 4 has not received the communication channel activation request response signal transmitted by the mobile station 1 due to a blocking trouble. Thereafter, the controlling portion 23 outputs the message 3 (at step S74), transmits the communication channel activation request once again (at step S71), and waits for the communication channel activation request response (at step S72).

The message 3 informs a calling user of the public telephone network 3 that the base station 2 is attempting to connect a call to the mobile station 1 and asks the user to wait for a moment.

When the controlling portion 23 has determined that the timer value "tB2" of the timer tB2 exceeds the maximum value TB2 at step S73, the controlling portion 23 determines that the power of the mobile station 1 has been turned off or that the mobile station 1 is not in a proper area with a sufficient receiving level, transmits the message 4 to the public telephone network 3 (at steps S75 and S55), and discards the termination sequence (at step S76).

The message 4 informs a calling user of the public telephone network 3 that the termination sequence will be discarded.

As described above, according to the embodiment of the present invention, when the user of the mobile station 1 predicts that the mobile station 1 will become difficult to receive a call, the user issues the termination difficulty state registration request to the base station 2 so as to set the base station 2 and the mobile station 1 to the termination difficulty mode. When a mobile station 1 that has been registered in the termination difficulty mode is called, the base station 2 transmits a control signal to the mobile station 1 several times. In addition, when the mobile station 1 has entered the termination difficulty mode, the mobile station 1 transmits a control signal to the base station 2 several times.

When the mobile station 1 has not received the relevant control signal from the base station 2 or when the controlling portion 13 of the mobile station has determined that the base station 2 has not received the relevant control signal from the mobile station 1, the controlling portion 13 informs the user of the mobile station 1 that there is a termination call and that the mobile station 1 is not in a proper area for transmitting and receiving a call through the displaying portion 17 and the speaker 5, and asks the user to move the mobile station 1 to a proper area in a predetermined time period. After exchanging the control signals, the controlling portion 13 starts a communication.

When the base station 2 has not received the relevant control signal from the mobile station 1 or when the controlling portion 23 of the base station 2 has determined that the mobile station 1 has not received the relevant control signal from the base station 2, the controlling portion 23 of the base station 2 expects that the mobile station 1 will move to a proper area for transmitting/receiving a call in a predetermined time period and transmits a message for asking a calling user of the public telephone network 3 to wait for a predetermined time period. After exchanging the relevant control signals, the controlling portion 3 starts a communication.

Thus, when the user of the mobile station 1 can predict that it will not stably transmit/receive a radio wave due to a blocking trouble or a shadowing trouble, the controlling portion 13 causes the mobile station 1 and the base station 2 to enter the termination difficulty mode. Thus, the base station 2 transmits the termination request to the mobile station 1 several times. The mobile station 1 transmits the termination request response to the base station 2 several times. The controlling portion 23 of the base station 2 acknowledges the termination request response transmitted from the mobile station 1 several times. The base station 2 transmits the communication channel activation request to the mobile station 1 several times. The controlling portion 13 of the mobile station 1 acknowledges the communication channel activation request response transmitted from the base station 2 several time. Thus, opportunities for receiving calls increase in the mobile station 1.

Next, another embodiment of the present invention will be described.

In the termination controlling sequence shown in FIGS. 4 and 5, two types of control signals are transmitted as the termination request signal and the communication channel activation request signal from the base station. In addition, two types of control signal are transmitted as the termination request response signal and the communication channel activation request response signal from the mobile station. In addition, an acknowledgment request signal and an acknowledgment request response signal may be preceded by the termination request signal and the termination request response signal, respectively. Thus, more than two types of control signals may be transmitted from each of the mobile station and the base station. In this case, corresponding to the increase of the types of control signals, timers and maximum values thereof are added.

In the termination controlling sequence shown in FIGS. 4 and 5, the threshold value and the maximum value of each timer are fixed values. However, when the user registers the termination difficulty mode, he or she may set these values.

When the user of the mobile station can set the threshold value of each timer corresponding to a time period necessary for moving the mobile station to a proper area for receiving a radio wave, the usefulness is improved.

In FIG. 1, the communication satellite 4 is used as a means for relaying a call between the base station 2 and the mobile station 1. However, the communication satellite 4 may be omitted or another relaying means may be used.

As described above, according to the mobile communication termination controlling method and the mobile communication termination controlling system of the present invention, when then user of each mobile station can expect that it will become difficult to stably transmit/receive a radio wave, the user registers the termination difficulty mode to the base station. When a call is terminated to a mobile station that has been registered in the termination difficulty state, the mobile station enters the termination difficulty mode. When the controlling portion of each of the mobile station and the base station determines that termination control information has not been successfully exchanged therebetween, the relevant termination control information is re-transmitted several times. The controlling portion of the base station informs a calling user of the public telephone network of the situation of the termination control. In addition, corresponding to the situation of the termination control, the controlling portion of the mobile station asks the user for a command that represents an action necessary for stably performing the termination control. Thus, when the receiving condition of the mobile station is not good, the termination control is repeated a predetermined number of times until it is successfully completed. Corresponding to the command issued to the user, he or she can move the mobile station to a proper area in which the termination control is stably performed. In addition, corresponding to the situation of the termination control, a calling user of the public telephone network can wait until the termination control is stably performed. Thus, even if the receiving condition of the mobile station is not good, opportunities for receiving calls increase in the mobile station. Consequently, the probability for entering a communication state increases.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A mobile communication termination controlling method for controlling each of a plurality of mobile stations to which a call is transmitted from a public telephone network connected to a base station, the mobile stations being connected to the base station with a radio circuit, the method comprising the steps of:

(a) registering a termination difficulty state to each of the mobile stations when it is predicted that the mobile station will not stably transmit and receive a radio wave;

(b) causing a mobile station that has been registered in the termination difficulty state at step (a) and that has a call transmitted from the public telephone network to enter a termination difficulty mode;

(c) determining whether or not termination control information has been unsuccessfully exchanged between the mobile station in the termination difficulty mode and the base station;

(d) repeating a termination control of the unsuccessfully exchanged termination control information that has been determined at step (c) a predetermined number of times;

(e) informing the user of the mobile station of the state of the termination control performed at step (d); and (f) issuing a command to the user of the mobile station so as to stably perform the termination control corresponding to the state of the termination control performed at step (d).

2. The mobile communication termination controlling method as set forth in claim 1, wherein step (a) comprises the steps of:

(g) causing the base station to update the termination difficulty state of each mobile station corresponding to a termination difficulty state registration request that is transmitted from the mobile station to the base station in the case that it is predicted that the mobile station will not stably transmit and receive a radio wave; and (h) storing termination difficulty state registration permission completion information that represents that the termination difficulty state has been registered for each mobile station corresponding to termination difficulty registration state permission information that has been updated at step (g) and that has been transmitted to the mobile station, and wherein step (c) is performed by determining whether or not termination control information has been unsuccessfully exchanged between the mobile station in the termination difficulty mode and the base station corresponding to a call to the mobile station that has been registered in the termination difficulty state updated at step (g) and the termination difficulty state registration permission completion information stored at step (h).

3. The mobile communication termination controlling method as set forth in claim 1, wherein step (c) comprises the steps of:

(i) determining that a termination request response has been unsuccessfully exchanged when the base station has not received the termination request response from the mobile station corresponding to the received result of a termination request transmitted from the base station to the mobile station;

(j) determining that a communication channel activation request response has been unsuccessfully exchanged when the base station has not received the communication channel activation request response from the mobile station corresponding to the received result of a communication channel activation request transmitted from the base station to the mobile station;

(k) determining that the termination request response has been unsuccessfully exchanged when the mobile station has received a termination request from the base station although the mobile station has transmitted a termination request response to the base station; and (l) determining that termination control information has been unsuccessfully exchanged corresponding to the received result of a communication channel activation request transmitted from the base station to the mobile station, and wherein step (d) comprises the steps of:

(m) repeating the termination control for the unsuccessfully exchanged termination request response determined at step (i) a predetermined number of times;

(n) repeating the termination control for the unsuccessfully exchanged communication channel activation request response determined at step (j) a predetermined number of times; and (o) repeating the termination control for the unsuccessfully exchanged termination request response determined at step (k) a predetermined number of times.

4. The mobile communication termination controlling method as set forth in claim 2, wherein step (c) comprises the steps of:

(i) determining that a termination request response has been unsuccessfully exchanged when the base station has not received the termination request response from the mobile station corresponding to the received result of a termination request transmitted from the base station to the mobile station;

(j) determining that a communication channel activation request response has been unsuccessfully exchanged when the base station has not received the communication channel activation request response from the mobile station corresponding to the received result of a communication channel activation request transmitted from the base station to the mobile station;

(k) determining that the termination request response has been unsuccessfully exchanged when the mobile station has received a termination request from the base station although the mobile station has transmitted a termination request response to the base station; and (l) determining that termination control information has been unsuccessfully exchanged corresponding to the received result of a communication channel activation request transmitted from the base station to the mobile station, and wherein step (d) comprises the steps of:

(m) repeating the termination control for the unsuccessfully exchanged termination request response determined at step (i) a predetermined number of times;

(n) repeating the termination control for the unsuccessfully exchanged communication channel activation request response determined at step (j) a predetermined number of times; and (o) repeating the termination control for the unsuccessfully exchanged termination request response determined at step (k) a predetermined number of times.

5. The mobile communication termination controlling method as set forth in claim 3, further comprising the steps of:

(p) defining a period for which the termination control for the unsuccessfully exchanged termination request determined at step (i) is repeated the predetermined number of times at step (m);

(q) defining a period for which the termination control for the unsuccessfully exchanged communication channel activation request determined at step (j) is repeated the predetermined number of times at step (n);

(r) defining a period for which the termination control for the unsuccessfully exchanged termination request response determined at step (k) is repeated the predetermined number of times at step (o); and (s) defining a period for which it is determined that the communication channel activation request has been unsuccessfully exchanged at step (l).

6. The mobile communication termination controlling method as set forth in claim 4, further comprising the steps of:

(p) defining a period for which the termination control for the unsuccessfully exchanged termination request determined at step (i) is repeated the predetermined number of times at step (m);

(q) defining a period for which the termination control for the unsuccessfully exchanged communication channel activation request determined at step (j) is repeated the predetermined number of times at step (n);

(r) defining a period for which the termination control for the unsuccessfully exchanged termination request response determined at step (k) is repeated the predetermined number of times at step (o); and (s) defining a period for which it is determined that the communication channel activation request has been unsuccessfully exchanged at step (l).

7. The mobile communication termination controlling method as set forth in claim 5, wherein step (e) comprises the step of:

(t) informing a calling user of the public telephone network that the base station is attempting to connect a call to the mobile station whenever the termination control for the termination request is repeated the predetermined number of times at step (m) in the period defined at step (p) and whenever the termination control for the communication channel activation request is repeated the predetermined number of times at step (n) in the period defined at step (q), and wherein step (f) comprises the step of:

(u) asking the user of the mobile station to move the mobile station to an area for stably performing the termination control whenever the termination control for the unsuccessfully exchanged termination request response determined at step (k) is repeated the predetermined number of times in the period defined at step (r) and whenever it is determined that the communication channel activation request has been unsuccessfully exchanged at step (o) in the period defined at step (s).

8. The mobile communication termination controlling method as set forth in claim 6, wherein step (e) comprises the step of:

(t) informing a calling user of the public telephone network that the base station is attempting to connect a call to the mobile station whenever the termination control for the termination request is repeated the predetermined number of times at step (m) in the period defined at step (p) and whenever the termination control for the communication channel activation request is repeated the predetermined number of times at step (n) in the period defined at step (q), and wherein step (f) comprises the step of:
- (u) asking the user of the mobile station to move the mobile station to an area for stably performing the termination control whenever the termination control for the unsuccessfully exchanged termination request response determined at step (k) is repeated the predetermined number of times in the period defined at step (r) and whenever it is determined that the communication channel activation request has been unsuccessfully exchanged at step (o) in the period defined at step (s).

9. A mobile communication termination controlling system for controlling each of a plurality of mobile stations to which a call is transmitted from a public telephone network connected to a base station, the mobile stations being connected to the base station with a radio circuit, the system comprising:

- termination difficulty state registering means for registering a termination difficulty state to each of the mobile stations when it is predicted that the mobile station will not stably transmit and receive a radio wave;
- termination difficulty mode entering means for causing a mobile station that has been registered in the termination difficulty state by said termination difficulty state registering means and that has a call transmitted from the public telephone network to enter a termination difficulty mode;
- termination control transmission/reception state determining means for determining whether or not termination control information has been unsuccessfully exchanged between the mobile station in the termination difficulty mode and the base station;
- termination control re-executing means for repeating a termination control of the unsuccessfully exchanged termination control information that has been determined by said termination control transmission/reception state determining means a predetermined number of times;
- termination control state informing means for informing the user of the mobile station of the state of the termination control performed by said termination control re-executing means; and
- termination control state improvement commanding means for issuing a command to the user of the mobile station so as to stably perform the termination control corresponding to the state of the termination control performed by said termination control re-executing means.

10. The mobile communication termination controlling system as set forth in claim 9,
wherein said termination difficulty state registering means comprises:
- mobile station termination difficulty state updating means for causing the base station to update the termination difficulty state of each mobile station corresponding to a termination difficulty state registration request that is transmitted from the mobile station to the base station in the case that it is predicted that the mobile station will not stably transmit and receive a radio wave; and
- termination difficulty state registration permission storing means for storing termination difficulty state registration permission completion information that represents that the termination difficulty state has been registered for each mobile station corresponding to termination difficulty registration state permission information that has been updated by said mobile station termination difficulty state updating means and that has been transmitted to the mobile station, and wherein said termination control transmission/reception state determining means determines whether or not termination control information has been unsuccessfully exchanged between the mobile station in the termination difficulty mode and the base station corresponding to a call to the mobile station that has been registered in the termination difficulty state updated by said mobile station termination difficulty state updating means and the termination difficulty state registration permission completion information stored by said termination difficulty state registration permission storing means.

11. The mobile communication termination controlling system as set forth in claim 9,
wherein said termination control transmission/reception state determining means comprises:
- base station side termination request determining means, disposed in the base station, for determining that a termination request response has been unsuccessfully exchanged when the base station has not received the termination request response from the mobile station corresponding to the received result of a termination request transmitted from the base station to the mobile station;
- base station side channel activation request determining means, disposed in the base station, for determining that a communication channel activation request response has been unsuccessfully exchanged when the base station has not received the communication channel activation request response from the mobile station corresponding to the received result of a communication channel activation request transmitted from the base station to the mobile station;
- mobile station side termination request determining means, disposed in the mobile station, for determining that the termination request response has been unsuccessfully exchanged when the mobile station has received a termination request from the base station although the mobile station has transmitted a termination request response to the base station; and
- mobile station side channel activation request determining means, disposed in the mobile station, for determining that termination control information has been unsuccessfully exchanged corresponding to the received result of a communication channel activation request transmitted from the base station to the mobile station, and wherein said termination control re-executing means comprises:
- base station side termination request re-executing means, disposed in the base station, for repeating the termination control for the unsuccessfully exchanged termination request response determined by said base station side termination request determining means a predetermined number of times; and
- base station side channel activation request re-executing means, disposed in the base station, for repeating the termination control for the unsuccessfully exchanged communication channel activation request response determined by said base station side channel activation request determining means a predetermined number of times; and mobile station side termination request re-executing means, disposed in the mobile station, for repeating the termination control for the unsuccessfully exchanged termination request response determined by said mobile station side termination request determining means a predetermined number of times.

12. The mobile communication termination controlling system as set forth in claim 10, wherein said termination control transmission/reception state determining means comprises:

base station side termination request determining means, disposed in the base station, for determining that a termination request response has been unsuccessfully exchanged when the base station has not received the termination request response from the mobile station corresponding to the received result of a termination request transmitted from the base station to the mobile station;

base station side channel activation request determining means, disposed in the base station, for determining that a communication channel activation request response has been unsuccessfully exchanged when the base station has not received the communication channel activation request response from the mobile station corresponding to the received result of a communication channel activation request transmitted from the base station to the mobile station;

mobile station side termination request determining means, disposed in the mobile station, for determining that the termination request response has been unsuccessfully exchanged when the mobile station has received a termination request from the base station although the mobile station has transmitted a termination request response to the base station; and mobile station side channel activation request determining means, disposed in the mobile station, for determining that termination control information has been unsuccessfully exchanged corresponding to the received result of a communication channel activation request transmitted from the base station to the mobile station, and wherein said termination control re-executing means comprises:

base station side termination request re-executing means, disposed in the base station, for repeating the termination control for the unsuccessfully exchanged termination request response determined by said base station side termination request determining means a predetermined number of times; and base station side channel activation request re-executing means, disposed in the base station, for repeating the termination control for the unsuccessfully exchanged communication channel activation request response determined by said base station side channel activation request determining means a predetermined number of times; and mobile station side termination request re-executing means, disposed in the mobile station, for repeating the termination control for the unsuccessfully exchanged termination request response determined by said mobile station side termination request determining means a predetermined number of times.

13. The mobile communication termination controlling system as set forth in claim 11, further comprising:

termination request re-executing period limiting means for defining a period for which the termination control for the unsuccessfully exchanged termination request determined by said base station side termination request determining means is repeated the predetermined number of times by said base station side termination request re-executing means;

channel activation request re-executing period limiting means for defining a period for which the termination control for the unsuccessfully exchanged communication channel activation request determined by said base station side channel activation request determining means is repeated the predetermined number of times by said base station side channel activation request re-executing means;

termination request response re-executing period limiting means, disposed in the mobile station, for defining a period for which the termination control for the unsuccessfully exchanged termination request response determined by said mobile station side termination request determining means is repeated the predetermined number of times; and communication channel activation request determination period limiting means for defining a period for which said mobile station side channel activation request determining means determines that the communication channel activation request has been unsuccessfully exchanged.

14. The mobile communication termination controlling system as set forth in claim 12, further comprising:

termination request re-executing period limiting means for defining a period for which the termination control for the unsuccessfully exchanged termination request determined by said base station side termination request determining means is repeated the predetermined number of times by said base station side termination request re-executing means;

channel activation request re-executing period limiting means for defining a period for which the termination control for the unsuccessfully exchanged communication channel activation request determined by said base station side channel activation request determining means is repeated the predetermined number of times by said base station side channel activation request re-executing means;

termination request response re-executing period limiting means, disposed in the mobile station, for defining a period for which the termination control for the unsuccessfully exchanged termination request response determined by said mobile station side termination request determining means is repeated the predetermined number of times; and communication channel activation request determination period limiting means for defining a period for which said mobile station side channel activation request determining means determines that the communication channel activation request has been unsuccessfully exchanged.

15. The mobile communication termination controlling system as set forth in claim 13, wherein said termination control state informing means comprises:

caller informing means for informing a calling user of the public telephone network that the base station is attempting to connect a call to the mobile station whenever the termination control for the termination request is repeated the predetermined number of times by said base station side termination request re-executing means in the period defined by said termination request re-executing period limiting means and whenever the termination control for the communication channel activation request is repeated the predetermined number of times by said base station side channel activation request re-executing means in the period defined by said channel activation request re-executing period limiting means, and wherein said termination control state improvement commanding means comprises:

mobile station user informing means for asking the user of the mobile station to move the mobile station to an area for stably performing the termination control whenever the termination control for the unsuccessfully exchanged termination request response determined by said mobile station side termination request determining means is repeated the predetermined number of times in the period defined by said termination request response re-executing period limiting means and whenever said mobile station side channel activation request determining means determines that the communication channel activation request has been unsuccessfully exchanged in the period defined by said communication channel activation request determination period limiting means.

16. The mobile communication termination controlling system as set forth in claim 14, wherein said termination control state informing means comprises:

caller informing means for informing a calling user of the public telephone network that the base station is attempting to connect a call to the mobile station whenever the termination control for the termination request is repeated the predetermined number of times by said base station side termination request re-executing means in the period defined by said termination request re-executing period limiting means and whenever the termination control for the communication channel activation request is repeated the predetermined number of times by said base station side channel activation request re-executing means in the period defined by said channel activation request re-executing period limiting means, and wherein said termination control state improvement commanding means comprises:

mobile station user informing means for asking the user of the mobile station to move the mobile station to an area for stably performing the termination control whenever the termination control for the unsuccessfully exchanged termination request response determined by said mobile station side termination request determining means is repeated the predetermined number of times in the period defined by said termination request response re-executing period limiting means and whenever said mobile station side channel activation request determining means determines that the communication channel activation request has been unsuccessfully exchanged in the period defined by said communication channel activation request determination period limiting means.

* * * * *